United States Patent Office 3,117,245
Patented Jan. 7, 1964

3,117,245
CERAMIC-GLAZED ELECTROLUMINESCENT LIGHTING PANEL PROTECTED BY SILOXANE-BONDED LINEAR ORGANIC POLYMER FILM
John E. Ehrreich, Arlington, Mass., assignor to W. R. Grace & Co., Cambridge, Mass., a corporation of Connecticut
No Drawing. Filed Jan. 3, 1961, Ser. No. 79,963
3 Claims. (Cl. 313—108)

This invention is concerned with the weatherproofing of electroluminescent lamps or light panels of the type that have a thin glazed exterior surface. Moisture penetration and consequent electrolytic decomposition of the phosphor is prevented in such lamps according to this invention by affixing a weather-resistant polymer film on the ceramic glazed surface by means of a siloxane resin adhesive.

Electroluminescent lamps and their uses are known to the art e.g., see "Electroluminescence," Science, February 27, 1959, vol. 129, No. 3348, pp. 544–550. While various designs have been suggested for adapting electroluminescence to outdoor service such as in highway signs, the lamps, in general, have fallen short of having adequate weatherability. One type of lamp construction that has been suggested involves the basic flat plate condenser construction usually supported on a metal backing and protected with an exterior ceramic glaze. The condenser consists of a phosphor containing dielectric medium or lamina between two thin electrode lamina, at least one of which transmits light. The light-transmitting electrode lamina is protected with a ceramic glaze, usually 5 to 15 mils thick. (Type C as described in Science.)

While the glaze does serve to protect the phosphor, moisture penetration in outdoor service has still been a problem when glazes of reasonable thicknesses are used. In the Humidity Cabinet Life Test, the ceramic glaze-protected lamps have lives, on the average, of about 200 hours. This corresponds to an indoor life of about five years. Their outdoor life may be as little as a few days under adverse weather conditions. The Humidity Cabinet Life Test involves mounting a lamp lit with 110 volt-60 cycle current in a cabinet maintained at 100° F. and 100 percent relative humidity until it fails by arcing through.

Plastic coating of the glazed surface of the lamp has been practiced, but thick, and thus relatively expensive coatings formed by potting have been the only successful ones developed so far.

The present invention proposes to enhance the protection afforded by the glazed surface by affixing thereon a 0.5 to 5 mil moisture-resistant plastic film, using a siloxane resin adhesive. A mil equals 0.001 inch. This adhesive gives surprisingly good bondings as compared to other known adhesives. In addition, it has the desirable property of in itself imparting moisture resistance to the panel. The combination of the bonded film with the glaze has been found to impart the desired weatherability to the lamp.

The plastic film has the requisite clarity, toughness, adherence, actinic light-resistance, continuity, and moisture vapor resistance in combination with the ceramic glaze to impart to the electroluminescent lamp a life of over 1,000 hours in the Humidity Cabinet Life Test. The film is thin, under 5 mils, and is therefore inexpensive. The protective plastic film is readily and easily applied by first applying the siloxane resin adhesive in solution, allowing the solvent to evaporate or dissipate, and then firmly and evenly applying the film to the adhesive-coated surface.

The pre-formed linear organic polymer films used in this invention have moisture vapor transmission of less than 5 grams per 100 square inch per 24 hours at 100° F. and 95 percent relative humidity when tested as a 1 mil film. The tensile strength of the film should be greater than 1000 p.s.i. The films should transmit at least 80 percent of the generated light. The films can, and desirably do contain minor amounts up to about 2 weight percent of such known ultra-violet light absorbers as phenyl salicylate, 4-tertiary butyl phenyl salicylate, 5-chloro-2-hydroxybenzophenene, and 2,4-dibenzoylresorcinol.

Suitable plastics that can be used are polyvinylidine chlorides, polymeric amides (nylon), terephthalate resins, polyethylene, polypropylene and polytetrafluoroethylene. Films can be formed from these polymers by conventional extrusions or calendering.

The ceramic glaze on the metal oxide light transmitting electrode of the lamp is formed from powdered glass in a manner known to the art by coating the electrodes with the ceramic powder and fusing by heating to 1000° F. to 2000° F. The surface obtained is usually continuous, but occasionally it may contain pin holes, cracks, and holidays.

It is difficult to secure good bonding of plastic films directly to this ceramic surface. In the present invention this difficulty is overcome by using a siloxane resin adhesive which shows good adherence both to the plastic film and to the ceramic surface. The amount of adhesive used is in the range of 0.5 to 50 grams per square foot.

The adhesive is a polyorganosiloxane resin-solvent solution. It can be a mixture of a polytrialkyl siloxane resin with 1 to 3 parts by weight of a viscous polydialkyl siloxane fluid, a small amount of a lower alkoxy polysilicate or hydrogen-bearing siloxane crosslinking agent, and a metal soap catalyst. This mixture is carried as a 10 to 70 weight percent solution in a volatile aliphatic or aromatic solvent. The alkyl groups of the resin and of the siloxane fluid have preferably from 1 to 3 carbon atoms. The fluid has a viscosity of 5,000 to 1,000,000 centipoises at 77° F. See United States Patent 2,814,601.

Example I

A silicone adhesive is prepared by reacting the following ingredients:

| | Percent |
|---|---|
| Concentrated hydrochloric acid | 8.7 |
| Water | 30.1 |
| Sodium silicate | 15.1 |
| Isopropanol | 20.0 |
| Trimethylchlorosilane | 7.7 |
| Hexamethyldisiloxane | 10.0 |
| Xylene | 8.4 |

The acid is diluted with one-sixth of the water. The sodium silicate is diluted with the remainder of the water and the solution is stirred into the acid. Three-quarters of the isopropanol is then added with stirring, followed by the trimethylchlorosilane and the hexamethyldisiloxane. The mixture is refluxed and cooled. The remainder of the xylene is added and the resin-solvent layer is separated from the acid layer. The remainder of the isopropanol is added and a solution is stripped to a temperature of 266° F. with carbon dioxide. Additional xylene is added to adjust the solids content of the solution to 75 percent.

67 percent by weight of the resin is mixed with 33 percent by weight of a 25,000 centipoises hydroxyl end-blocked dimethylpolysiloxane, also dissolved in xylene, to give a 75 weight percent solution. To this is added 3 percent by weight based on total solids of ethyl polysilicate and 3½ percent by weight on the solids of dibutyltindilaurate.

This adhesive solution is applied to the glazed surface of a commercially available electroluminescent light panel (Sylvania Night Lite). The glazed surface area of the panel is about four square inches. The panel is constructed as follows: (order of layers)

(1) 20 mil steel backplate
(2) Two fused ceramic insulating coatings
(3) Phosphor coating
(4) Tin oxide conductive coating
(5) Ceramic protective coating
(Contact: powdered silver in epoxy resin.)

The siloxane adhesive is applied by brushing the glazed surface with the xylene solution. The xylene is evaporated by heating the surface with infrared lamps. A polyvinylidene chloride copolymer film is then evenly smoothed over the surface. The polyvinylidene chloride copolymer is a copolymer of 87 percent vinylidene chloride and 13 percent vinyl chloride. The film is prepared by extruding the polymer from a melt to a thickness of 1 mil.

*Example II*

The same type of panel as described in Example I was coated with various films using a siloxane adhesive (Dow Corning 271–a 37 weight percent siloxane resin solution carried in xylene). The following films were used:

| Name | Chemical composition | Thickness, mils |
|---|---|---|
| Saran | vinylidene chloride-vinyl chloride copolymer. | 1 |
| "Mylar" | diethyl terephthalate-ethylene glycol condensate. | 1 |
| Nylon | hexamethylene diamine-adipic acid condensate. | 1 |
| "Teflon" | polytetrafluoroethylene | 10 |

The films were applied to the test panels by dip coating the panels in 10 to 30 percent adhesive solutions, evaporating the solvent, and smoothing the films over the panels.

The panels were then tested in the Humidity Cabinet Life Test and the following results were obtained:

| Protective film: | Hours to failure |
|---|---|
| Saran | 1080 |
| "Mylar" | 1080+ |
| Nylon | 576 |
| "Teflon" | 1080+ |
| Unprotected | [1] 200 |

[1] Average.

The bond in all cases obtained between the ceramic glaze and the polymer film exceeded 0.5 pound per inch width as tested in a standard Scott tester at a pull back angle of 180° and a pull rate of two inches per minute.

Having described this invention, what is sought to be protected by Letters Patent is succinctly set forth in the following claims:

What is claimed is:

1. In an electroluminescent lamp comprising a phosphor containing dielectric medium between two electrodes at least one of which electrodes passes light and a light-transmitting ceramic glaze over the light-transmitting electrode, the improvement comprising a 0.5 to 5.0 mil thick continuous moisture-vapor-resistant film of a linear organic polymer bonded to said ceramic glaze with a siloxane resin adhesive.

2. The lamp of claim 1 when said adhesive is applied as a 10 to 70 weight percent solution in a volatile solvent to the glazed surface, the solvent being substantially removed prior to the affixing of said film.

3. The lamp of claim 1 wherein said polymer is selected from the group consisting of film forming polyvinylidene chlorides, terephthalate resins, polyamides, and tetrafluoroethylene resins.

References Cited in the file of this patent
UNITED STATES PATENTS
2,774,004   Jaffe _____ Dec. 11, 1956